United States Patent
Wang

[19]

[11] Patent Number: 5,819,350
[45] Date of Patent: Oct. 13, 1998

[54] PROCESS FOR CONTINUOUSLY PRODUCING CARBON FABRIC ADSORBENTS AND DEVICE THEREFOR

[76] Inventor: Chi-Hsiang Wang, 140 Wu Yi Street, Taichung, Taiwan

[21] Appl. No.: 848,487

[22] Filed: May 8, 1997

[30] Foreign Application Priority Data

Aug. 19, 1996 [TW] Taiwan ................................. 85110109

[51] Int. Cl.$^6$ ..................................................... D06B 3/10
[52] U.S. Cl. ................................. 8/149.3; 8/151; 68/5 C; 68/205 R
[58] Field of Search ................................ 8/149.1, 149.2, 8/149.3, 151; 68/5 C, 5 D, 5 E, 205 R

[56] References Cited

U.S. PATENT DOCUMENTS

| | | | |
|---|---|---|---|
| 4,075,875 | 2/1978 | Heidan | 68/5 D |
| 4,461,159 | 7/1984 | Prescott | 68/5 D |
| 5,197,306 | 3/1993 | Yamakita | 68/205 R |
| 5,522,161 | 6/1996 | Vetter | 68/5 D |
| 5,586,739 | 12/1996 | Fleissner | 68/5 D |
| 5,724,689 | 3/1998 | Milligan et al. | 58/5 D |

FOREIGN PATENT DOCUMENTS

| | | | |
|---|---|---|---|
| 2716265 | 10/1978 | Germany | 68/5 D |
| 60-17169 | 1/1985 | Japan | 68/5 D |
| 397939 | 2/1966 | Switzerland | 68/5 D |
| 553316 | 6/1977 | U.S.S.R. | 68/5 D |

*Primary Examiner*—Frankie L. Stinson
*Attorney, Agent, or Firm*—Burns, Doane, Swecker & Mathis, LLP

[57] ABSTRACT

Carbon fabric adsorbents are produced by using a cellulose fabric as precursor, which is pretreated by washing with water, drying, immersion in chemical solution, force adsorbing and drying to be rewound into rolls; leading the pretreated roll by one end into a high temperature reactor from the upper end of the reactor and out from below the reactor at a set rolling up speed; controlling the temperature from the upper part to the lower part in the reactor body by gradually increasing it, wherein at the lowest part where it is adjacent the outlet port the temperature is controlled to permit the precursor that has passed through inside the reactor to be heated gradually from the above downwardly so that the precursor is oxidized, carbonized and activated; while the precursor is being subject to reaction treatment in the reactor, passing on the lower part of the reactor a reverse water vapor stream opposite the direction of action of the precursor to allow the precursor to be activated and to blow clean micro-particles and tars from its surface; and rewinding the activated carbonized textile leading out from the lower part of the reactor onto a rewinding roller.

4 Claims, 2 Drawing Sheets

PROCESS FOR CONTINUOUSLY PRODUCING CARBON FABRIC ADSORBENTS AND DEVICE THEREFOR

FIELD OF THE INVENTION

The present invention relates to a process and device for continuously producing carbon fabric adsorbents and, in particular, to a manufacture process and the device therefor whereby cloth-like carbon fabric adsorbents are produced by using cellulose fabric as precursors and through a continuous oxidization, carbonization and activation treatment in a single vertical reactor.

As defined herein, the so-called carbon fabric adsorbent in accordance with the present invention means the material, which not only possesses the characteristic of a carbon fiber has also functions as concentrating, limiting, adsorbing or dispersing with relation to gas in the air, liquid in the fluid or solute in the solution.

Activated carbon is a material having excellent powers of adsorption, decoloration and deodorization and is therefore used extensively in the fields of chemistry, medicine, military and environmental protection engineerings. However, the traditional activated carbons are mainly in the form of powders or granules, which, in management and application, are often limited by the form and always cause embarrassment in supplement or replacement. Hence, in recent years there has been a lot of research and development on carbon fiber adsorbents in the form of fiber or fabric produced with fiber materials. Because the adsorbents of such a form possess properties of being easy to cutting and shaping, rolling, winding, twisting and forming, and to maintaining in various forms, these materials have therefore been adapted for use in a variety of usages and have also expanded in range of applications, such as: for example, use on poison protecting coats or poison protection mask for protection against war chemical agents. The fruit of this breadthrough not only has set up a new mile stone for the development of activated carbon adsorbent industry, but has also created another high value-added new material for fiber industry.

With relation to the process for manufacturing fiber-like carbon fabric adsorbents, there are, for instance, JPN Laid Open No. 60-45123 which describes activated carbon fibers by oxidization and activation of polypropylene cyanide fiber; JPN Laid Open No. 59-19989 which teaches activated carbon fibers by heat carbonization of staple fiber; JPN Laid Open Nos. 3-199427 and 3-206126 disclose the activation of leached fibers to form globular fiber block activated carbon fibers. Because the products so obtained are of a bundling like fiber form, they are, unlike powder or granular activated carbons which get scattered and run off easily, even more convenient to use on many applications. However, because after carbonization the fibers with regard to the strength are inappropriate for weaving to form cloths, there is still the feel of inconveniences where when use in the textile form is more advantageous.

Currently, there are already fabric or cloth type activated adsorbents available in market, which are produced by treatment directly of the fibrous fabric as the precursor. The method of production is, however, mainly by batchwise treatment and only a specified amount can be processed in each batch, which considerably restrict the production capacity. Furthermore, in the process of batchwise treatment because of difference in the processing amount there is always likeliness of developing a control error. Also because the distributions in temperature and reaction gas received on the various parts of the processed article are not uniform and of the effect that tar easily gets accumulated under treatment at a static state it has been difficult to obtain products of uniform quality. Besides that, there are also problems waiting to be solved that under each batch treatment, it has to raise or lower the temperature in the processing furnace and the products on and again, which thus causes a waste of time and energy.

To solve the above problem, there has recently developed a process whereby the precursor in a fibrous fabric form is led into a horizontal oxidation reactor for oxidation treatment by use of supply roller and coiling roller to produce an oxidized fibrous fabric or by oxidized fiber yarn that has been oxidized to weave an oxidized fiber cloth, and thereafter it is led again into a similarly horizontal type high temperature carbonization and activation furnace for carbonization and activation treatment to produce adsorbents of a fabric form. By this way, because it is possible to treat the precursors continuously in the course of the process into the oxidized semifinished goods and next treat them by the same method to form carbonized activated finished goods, it has greatly raised the production capacity. Nevertheless, as two sets of furnaces and related cloth rewinder devices are required to be set us, the expenses for installation and maintenance are high and also the factory plants occupy a large area of place. Also, during treatment of the fabrics, owing to the temperature difference produced by the temperature distribution effect between the upper and lower surfaces of the cloth and at the exit and entry of the furnace and the influence of distribution effect of the reaction gas and, additionally, the tar and the carbon microparticles produced during the process being easy to get adhered to the upper surface of the fabrics there are still places required for improvements. Several solutions have been proposed whereby in place of the horizontal furnace a vertical treating reactor is used and the cloth precursors are led from below into the oxidation furnace and after reaching the upper end are again led out downwardly in the opposite direction. Thereafter, the oxidized precursors are again led from downward upwardly into carbonization and activation furnaces to be subjected to carbonization and activation treatment to form finished products. Although in this way the various shortcoming problems such as on the temperature distribution brought about by the horizontal treatment of a horizontal furnace and the tar can be avoided, however, as likewise two sets of furnaces have to be used, it has not been economical either. Furthermore, since the disposition of temperature at each furnace is such that the temperature is gradually higher from below upward with the highest temperature in the outlet at the upper end of the furnace, useful heat can be instantaneously discharged out of the furnace along with the reactant waste gases and its failure to be fully utilized has also become a wastage. In particular, although by the foregoing continuous process technique whether by a horizontal type furnace or a vertical type furnace, the production capacity is raised several times than by the batchwise treatment the process speed has nevertheless been maintained at a level of 50 to 100 cm/hr only, which still needs for improvement.

In view of the above, the applicant has through a long time research and experiments accomplished a single-furnace continuous production method and device for carbon fabric adsorbents.

Accordingly, a primary object of the present invention is to provide a process for continuously producing carbon fabric adsorbents using fabrics of cellulose series fibers as precursors in the only vertical reactor by a series of oxidation, carbonization and activation treatments to produce the carbon fabric adsorbents with a homogeneous, light weight and highly microporous quality and a strong adsorption capacity and fast adsorption speed.

A further object of the present invention is to provide a device for continuously producing carbon fabric adsorbents, which is simple in construction with a low cost in installation expenses and is capable of fast and continuously producing carbon fabric adsorbents at a high production rate.

In order to accomplish these objects, the present invention uses mainly fabrics of cellulose series fibers, in particular, the viscous fluid rayon cloth, multi-component fiber cloth, elastic rayon cloth and natural fiber fabrics as the precursors, which, after first pretreatments of washing with waters and chemical treatment, are led out by one end thereof in the state of a winding drum cloth and are led continuously from the above downwardly at the specified rate of speed into a vertical high-temperature reactor with a multiple-stage independent temperature control, and which subjecting to oxidation, carbonization and activation treatments at an atmosphere of water vapor flowing naturally from below upwardly produce cloth from carbon fabric adsorbents.

BRIEF DESCRIPTION OF DRAWINGS

The present invention is illustrated in the accompanying drawings, wherein.

DETAILED DESCRIPTION OF THE PREFERRED EMBODIMENTS

Other objects and advantages of the invention will become apparent from the following description of a preferred embodiment of the process and device.

Figure 1:
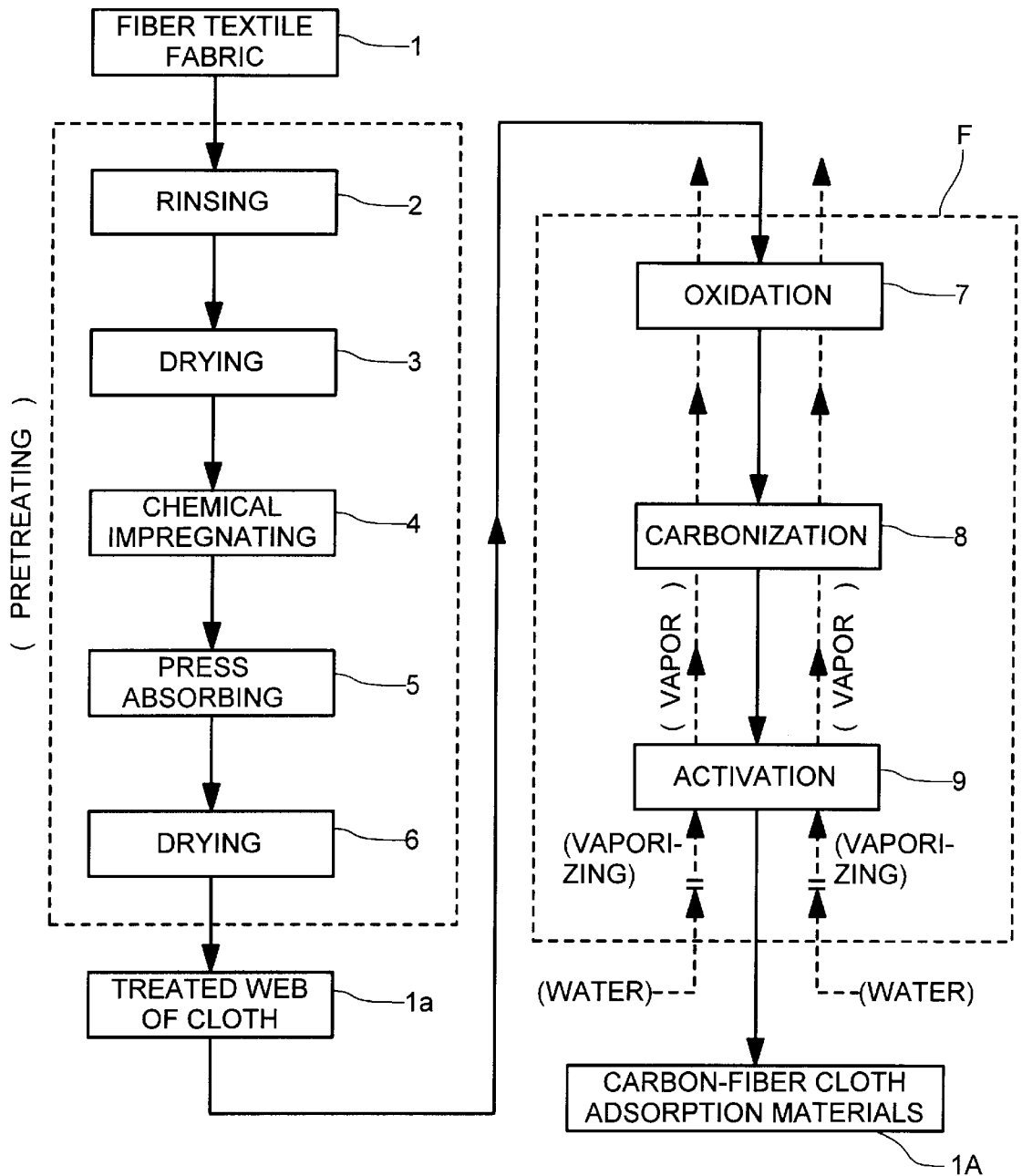
FIG. 1 shows a flowchart of production process of the present invention.

As shown in FIG. 1, for use as the precursors of the invention fibrous fabrics are used, which of course cover the natural fibers and man-made fibers. The form of the fabrics may be of a cloth form of shuttle fibers, needle fabrics and nonwoven fabrics, however, experiments show that the regenerated fibrous shuttle fabrics of cellulose series are the most preferred.

The precursor fibrous fabrics 1 are first led by a winding device (not shown) through a washing tank 2 containing the usual suitable washing solution for washing clean, they are then subjected to dehydration and drying 3. Subsequently, after subjecting to an impregnating treatment 4 with a developed composite chemical solution of a flame resistant agent, the fiber textile fabrics 1 are subjected to a repeated press absorption 5 for 2–3 times and next to a drying process at 6 to thereby complete the usual pretreatment process. After the pretreatment, the fiber fabrics 1 are finally rolled up to form a web of cloth 1a and are transferred to the upper part of a vertical high temperature reactor F. The treated cloth 1a is led into the reactor F from the above vertically downward by another rewinding device (not shown) at the lower part of the reactor A. In the reactor the temperature is controlled from the above downwardly and the temperature from the lower to higher generally of 150° C. to 1200° C. Further, by subjecting from the above downwardly to a continuous oxidation 7, carbonization 8 and activation 9 with a reversely flowing (from below upwardly) high temperature steam, a high capacity carbon fabric adsorbent 1A is produced which appears in the form of a black color fabric.

Figure 2:
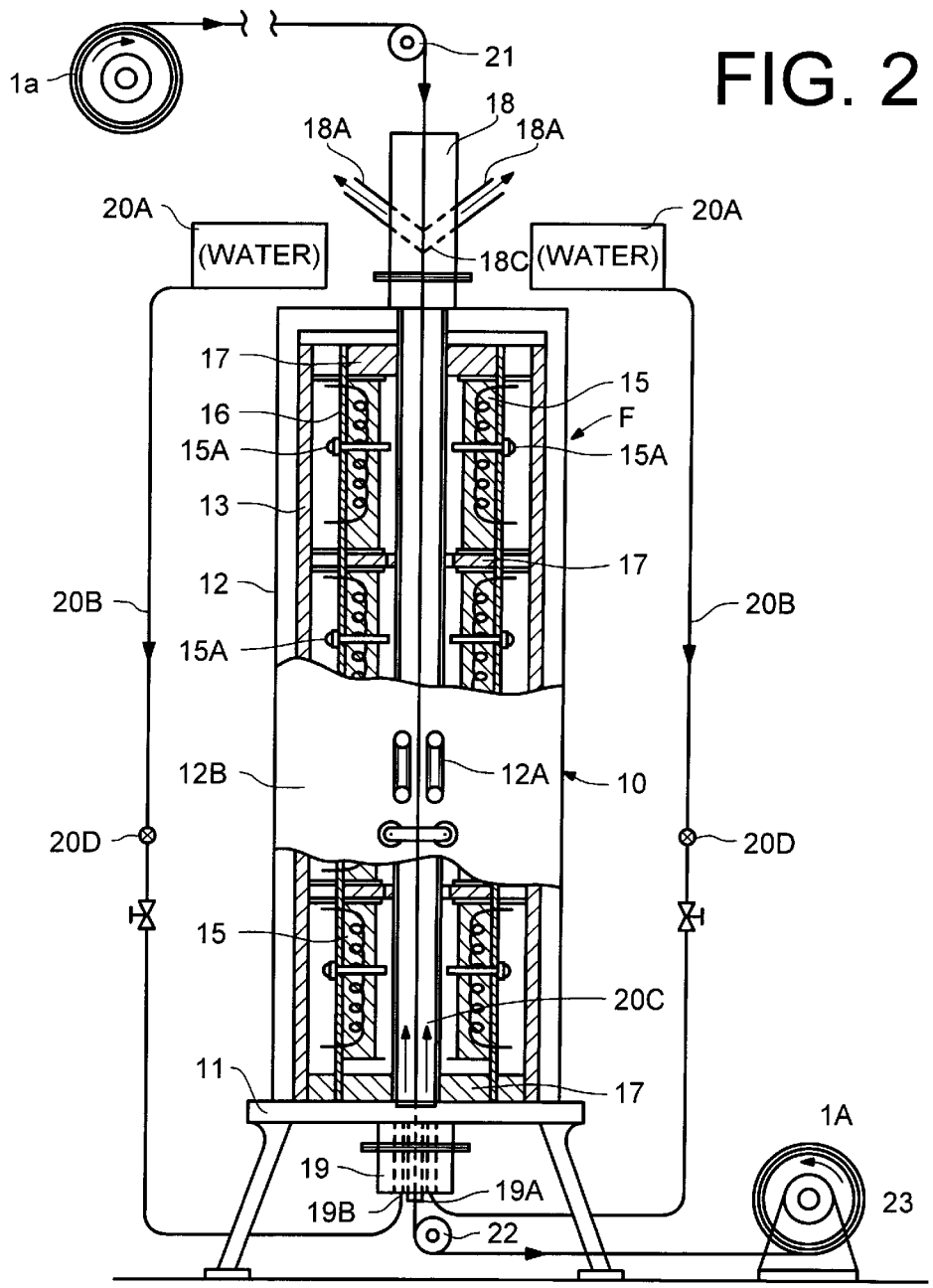
FIG. 2 shows a schematic view of the continuous production device of the present invention.
Figure 3:
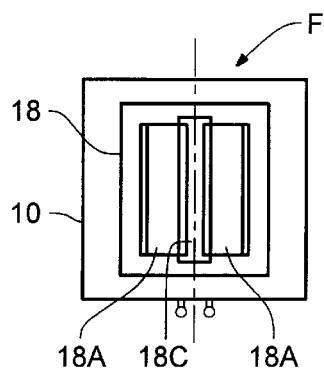
FIG. 3 shows a plan view of the device of the present invention.

FIGS. 2 and 3 show respectively a longitudinal sectional schematic view and a plan view of the device of the invention and as shown therein, the device consists mainly of a vertical high temperature reactor F. This high temperature reactor F includes a reactor supporting frame 11 and the straight barrel-type reactor body 10 vertically mounted on the supporting frame 11. The reactor body 10 comprises: a casing 12 having a twin open door 12b openable by a handle 12a, an inner sleeve 14 vertically disposed in the center of the casing 12 and sustained by a supporting skeleton 13 to act as a treatment chamber, a multistage electric heating element 15 located surroundingly between the outer periphery of the inner sleeve 14 and the supporting skeleton 13, a ceramic fiber felt 16 surrounding the outer periphery of the heating element 15 as a heat insulating material, annular insulating bricks 17 formed by dividing the heating element 15 into an upper and lower multi-section arrangement, a textile fiber leading-in opening 18 located extendedly at the reactor body 10, a treated carbon fabric leading-out opening 19 located extendedly at the lower end of the reactor body 10 between the support legs 11a, and a water supply system 20 leading water into the lower part of the inner sleeve 14 of the reactor body 10. Except the upper leading-in opening 18 for leading-in of the cloth and the lower leading-out opening 19 for leading-out of the cloth and leading-in of water, the reactor body 10 is formed of a sealed type and also the upper and lower multi-section heating elements 15 inside the reactor employ an independent temperature control mode where in each section the control of temperature is by a thermocouple 15a. Because the sections are still isolated by insulating bricks 17 and are adjustable, the effect of heat amount in each section can be minimized to the manimum. Generally, the number of sections in a heating element 15 can be more than four sections and the more the number of sections, the more precise will be the control of temperature. However, a good result is usually obtained when a six-section heating element is used. The leading-in opening 18 is a rectangular barrel body connected to the upper end of the inner sleeve 14 and of a similar type with this sleeve 14. On the two sides of the rectangular barrel body there are two outward and upwardly extending flat type exhaust pipes 18a for leading the exhaust air in the reactor together with the steam out obliquely upwardly. The flat type exhaust pipes 18a, symmetrically on the two sides of the rectangular barrel shaped leading-in opening 18, are inserted in the latter, leaving between the two insert ends a small gap opening 18c for accommodation of the cloth leading into the reactor, while exhaust air being mostly discharged out from the exhaust pipes 18a. The leading-out opening 19 is provided with narrow gap slot 19a for leading out the cloth, on the two sides of which are located orifices 19b for leading in water supply pipe outlet end of the water supply system 20. Because supply of water uses a natural supply by high waterhead level, to raise the waterhead a water tank 20a of the supply system 20 may generally be disposed on the upper part of the reactor F. Furthermore, one or two water tanks 20a may be used and the tanks be erected closely adjacent the places in the vicinity of the leading-in opening 18 or any other high places. Water supply pipes 20b of the tanks 20a are led from the above downwardly and again from the leading-in opening 19b on the lower end of the leading-out opening 19 into the interior of the heated area at the lowest section of the inner sleeve 14 of the reactor and the outlet ends 20c thereof are directed upwardly. On the midway of the water supply pipes 20*b* there is mounted a flow controller 20*d* for control of the flow.

In the embodiment of the six-section type temperature control shown in the drawing, the abovesaid electric heating element 15 may be established with, respectively: a region T1 of from room temperature to 150° C., a region T2 of below 400° C., a region T3 of below 650° C., a T4 of below 900° C., a T5 of below 1200° C. and T6 of below 600° C. However, it is not necessary that the electric heating element must be limited to the aforesaid number of sections and the temperatures; in sofar as the temperature in the inlet region is maintained at about 150° C. and that in the outlet region at about 500° C., the rest intermediate regions can be dispensed appropraitely within range from 300° C. to 1200° C. according to the number of the temperature controlling regions.

In the following, the process for producing carbon-fiber adsorbents by using the device in accordance with the principle of the present invention will be described in detail.

First of all, the furnace F is preheated until the required temperature is reached in all heating zones. Next, as precursor the rolled fiber textile fabric 1*a* is led out by one end thereof and through the leading wheel 21 hanged vertically from the leading-in opening 18 on the upper part of the furnace F down onto the treatment chamber. That is, inside the inner sleeve 14 this fiber textile fabric 1*a* is led out from the leading-out opening 19 on the lower part of the furnace F and through the leading wheel 22 is fixed to a reel of the rolling up unit 23. On the other hand, the water supply system 20 is switched open to lead water into the furnace F, water flows out from the extreme end of the water supply pipe 20B. Because here, the temperature reaches more than 500° C., water is instantly transformed into vapor and flows upwardly, and together with exhaust air is discharged out from the two sides of the leading-in opening 18. To this stage, the preparation of all of the operating procedure is said to be ready. Thereafter, the rolling up unit 23 is started on, the moving speed of the cloth like precursor 1*a* is controlled at 5 cm to 30 cm per minute (or 300 cm to 1800 cm per hour). Normally, at a speed of 10 cm to 20 cm per minute, the precursor 1 is driven to move slowly from the above downwardly, and through the leading-in opening 18 this precursor 1 enters into the inner sleeve 14 of the furnace F where surrounded by water vapor all around the precursor 1 goes through various treatments of oxidation, carbonization and activation in progression from a low temparature to a high temperature to form a cloth carbon fiber adsorbent 1A, which is finally rolled up onto the rolling up unit 23 to form a web of cloth 1A.

Since the precursor fiber textile fabric 1 moves from top to bottom in the furnace thereby making possible the use of its own weight in falling downwardly, with just a little rolling-up dynamic force it is thus possible to drive and roll up the fiber textile fabric easily. Further, as water also flows down and jets from the pipe end naturally by the waterhead, no pumping will be required thus resulting in a saving of energy resources. At the same time, when water has entered the furnace, this water absorbs the high tempearture in the furnace and is instantly changed to vapor to flow naturally upwardly. Following activation treatment of the fiber fabric from the above downwardly on change from oxidization to carbonization, the vapor is able to bring along upwardly and discharge out any tars, microparticles and mixed dust contained in the waste gas produced during oxidization and carbonization together with the waste gas. A surface-clean and impurity-free high quality carbon-fiber adsorbent 1A can thus be obtained. Again, because the inner sleeve produces a chimney action which is even more helpful to the upward flow of the water vapor, during treatment of the cloth, a small amount of air is absorbed through crevices on the two sides of the cloth from the leading-out opening 19 for use in the oxidation of the top portion. Furthermore, because higher temperature is at the bottom and lower temperature is on the top, by application of the natural phenomenon where the thermal current rises upwardly, the amount of energy required of the electric heating elements by zones, where the temperature decreases gradually as going upwardly, can be considerably reduced compared to reality, which also helps in a saving of energy, In the embodiment, four types of rayon series fiber textile fabric, namely: Regular, Modal, Polynosic and Tencel, are used as precursors and the carbon fiber adsorbent produced in accordance with the process of the invention, has, in summary, a physical property and strength as follows: the tensile strength (Kg/cm) has reached 2 to 3 Kg/cm and the material will not burn at 1200° C. With relation to the other properties and application effectiveness in comparison with known adsorbent materials the results of a comparison analysis are shown in Table I.

TABLE I

Comparison Analysis: Properties of different adsorbent materials
Test method and instrument: Quantachrome Autosorb Automated Gas Adsorption System Report
PSORB2PC Version 3.04

|  | Gas Type | nitrogen | Corr. Factor | 6.580E − 05 |
|---|---|---|---|---|
|  | Cross-sectional Area | 16.2 | Molec.Wgt | 28.0134 |
| Test | Regular Rayon | Polynosic | Modal | Tencel |
| Sample Description | 320 g/m$^2$ | 280 g/m$^2$ | 250 g/m$^2$ | 160 g/m$^2$ |
| Speed | 20 cm/min | 15 cm/min | 20 cm/min | 20 cm/min |
| Sample Weight | 0.0638 g | 0.1278 g | 0.0910 g | 0.0489 g |
| Analysis Time | 689.8 min | 779.4 min | 738.6 min | 463.0 min |
| Equil.Time | 3 | 3 | 3 | 2 |
| P/Po Toler | 2 | 2 | 2 | 4 |
| Outgas Time | 0.0 hrs | 12.0 hrs | 12.0 hrs | 0.0 hrs |
| Outgas Temperature | 250° C. | 250° C. | 250° C. | 0° C. |
| SURFACE AREA DATA (m$^2$/g) | | | | |
| Property 1 | Regular Rayon | Polynosic | Modal | Tencel |

TABLE I-continued

| | | | | |
|---|---|---|---|---|
| Single-Point BET | 2.520E + 03 | 1.844E + 03 | 2.379E + 03 | 2.018E + 03 |
| Multi-Point BET | 2.612E + 03 | 1.844E + 03 | 2.468E + 03 | 2.143E + 03 |
| Langmuir Surface Area | 4.106E + 03 | 2.988E + 03 | 3.966E + 03 | 3.785E + 03 |
| Meso Pore Area | 7.752E + 02 | 4.932E + 02 | 7.694E + 02 | 9.305E + 02 |
| t-Method Micro Pore Area | 1.837E + 03 | 1.391E + 03 | 1.698E + 03 | 1.212E + 03 |
| MP-Method Micro Pore Area | 3.077E + 03 | 2.320E + 03 | 2.853E + 03 | 2.233E + 03 |
| DR-Method Micro Pore Area | 3.751E + 03 | 2.794E + 03 | 3.540E + 03 | 2.885E + 03 |
| Cumulative Adsorption Surface Area | 1.186E + 02 | 6.925E + 01 | 1.348E + 02 | 1.425E + 02 |
| Cumulative desorption Surface Area | 1.250E + 02 | 1.491E + 02 | 1.211E + 02 | 1.355E + 02 |

| | PORE VOLUME DATA (cc/g) | | | |
|---|---|---|---|---|
| Proporty 2 | Regular Rayon for pores with Radius less than 1750.6 at P/Po = 0.9945 | Polynosic for pores with Radius less than 1506.4 at P/Po = 0.9936 | Modal for pores with Radius less than 1750.6 at P/Po = 0.9945 | Tencel for pores with Radius less than 15926.8 at P/Po = 0.9994 |
| Total Pore Volume | 1.393E + 00 | 1.056E + 00 | 1.346E + 00 | 1.233E + 00 |
| Cumulative Adorption Pore Volume for pores in the range of 300.0 to 17.5 Radius | 7.153E + 02 | 6.841E − 02 | 9.318E − 02 | 9.186E − 02 |
| Cumulative Desorption Pore Volume for pores in the range of 300.0 to 17.5 Radius | 6.925E − 02 | 1.318E − 01 | 1.007E − 01 | 7.756E − 02 |
| t-Method Micro Pore Volume | 7.759E − 01 | 6.137E − 01 | 7.163E − 01 | 4.744E − 01 |
| MP-Method Micro Pore Volume | 1.595E + 00 | 1.156E + 00 | 1.501E + 00 | 1.359E + 00 |

| | PORE SIZE DATA | | | |
|---|---|---|---|---|
| Property 3 | Regular Rayon | Polynosic | Modal | Tencel |
| Average Pore Radius | 1.066E + 01 | 1.121E + 01 | 1.091E + 01 | 1.151E + 01 |

According to the process of the invention, by passing through from top to bottom a sectionally temperature-controlled single high-temperature furnace (reactor) at a reverse water vapor atmosphere in the furnace of the textile fabric type precursors, a surface-clean capability-excellent carbon fiber adsorbent can be obtained, which has very small and densely distributed micropores and which is high-temperature resistant and does not burn with a particularly good adsorption capability. This adsorbent is accomplished by passing through the furnace only once at a high production rate of 6 to 18 m/h. Again, because the production of water vapor makes use of the temperature in the furnace for natural vaporization, no vapor generator outside the furnace is used, and since the rolling up of finish products and the treatment operating are done taking advantage of the force of gravity in the textile fabrics itself, a rather small moving force only is needed for the operation. Furthermore, since factory space occupied by an upright type furnace is less, expenses such as for installation, maintenance and supervision are only of a fraction compared to the conventional method. It is thus more economical by the present invention.

I claim:

1. A process for continuously producing carbon fiber cloth adsorbents, comprising the steps of:

a) using, as precursor, a cloth-like cellulose fabric which, after pretreated by washing with water, drying, immersion in chemical solution, force adsorbing and drying, to be rewound into cloth rolls;

b) leading the pretreated cloth roll precursor by one end thereof into a high temperature reactor from the upper end of the reactor and out from below said reactor at a set rewinding speed to be rewound into rolls;

c) controlling the temperature from the upper part to the lower part in the reactor body by gradually increasing the temperature from 150° C. to 1200° C. since the high temperature reactor follows an independent multistage temperature control, wherein at the lowest part where it is adjacent the outlet part the temperature is controlled at about 500° C. thereby permitting the precursor that has passed through inside the reactor be heated gradually from the above downwardly so that the precursor is oxidized, carbonized and activated;

d) while the precursor is being subjected to reaction treatment in the reactor, passing on the lower part of the reactor a reverse water vapor stream opposite the direction of action of the precursor to allow the precursor to be activated and to blow clean micro-particles and tars from the surface of the treated fiber fabric promoting concurrently an upward discharge of the waste heat; and e) rewinding the activated carbonized fiber textile, that has been led out from the lower part of the reactor, on to a rewinding roller to obtain a rolled carbon fiber cloth adsorbent.

2. A device for continuously producing carbon fiber cloth adsorbents, comprising a vertical high temperature reactor, a rewinding unit for drawing the treated fiber fabric that is led into the reactor and having the fabric to be wound outside of the reactor and a water supply system for leading water into the lower part of the reactor to be evaporated into vapor; wherein the high temperature reactor includes a casing having twin opening door leaves, a skeleton frame surrounding by the casing for supporting the reactor body, an inner sleeve disposed in the center of the casing and supported by the skeleton frame to act as a treating chamber, a multisection electric heating element disposed surroundingly between the outer periphery of the inner sleeve and the supporting skeleton frame, a heat insulating material surrounding the outer periphery of the electric heating element and between the section, insulating bricks dividing each section of the electric heating element into upper and lower parts, a fiber fabric leading-in opening located extendedly at the upper end of the reactor body, and a treatment-completed activated carbon-fiber fabric leading-out opening located extendedly at the lower end of the reactor body;

said multisection electric heating element constitutes an independent temperature controlling mode having from the upper part of the reactor body to the lower part a low temperature gradually increasing to a high temperature and dropping however to a medium temperature between the high and the low when close to the leading-out opening area.

3. A device according to claim 2, wherein the temperature control in the reactor body is the gradual increase from between 150° C. of the upper section to 1200° C. of the lower section whereas the temperature is controlled at about 500° C. at the lowest section close to the leading-out opening.

4. A device according to claim 2, wherein the supply of water uses the water level and also the vapor produced by natural evaporation at a high temperature inside the reactor.

* * * * *